(12) United States Patent
Ehlers et al.

(10) Patent No.: US 7,165,298 B2
(45) Date of Patent: Jan. 23, 2007

(54) METHOD OF MAKING A SURFACE ACOUSTIC WAVE DEVICE

(75) Inventors: Wayne L. Ehlers, Lanark, IL (US); Gary W. Eisenhower, Jr., Freeport, IL (US); Brian J. Marsh, Freeport, IL (US); James D. Cook, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 233 days.

(21) Appl. No.: 10/940,275

(22) Filed: Sep. 14, 2004

(65) Prior Publication Data

US 2006/0055286 A1    Mar. 16, 2006

(51) Int. Cl.
*H04R 17/00* (2006.01)
*H01L 41/00* (2006.01)

(52) U.S. Cl. ............ 29/25.35; 29/549; 29/832; 29/840; 29/846; 310/313 R; 310/340

(58) Field of Classification Search ............ 29/25.35, 29/832, 594, 840, 846; 310/313 R, 313 A, 310/313 B, 340, 322; 73/703, 702; 333/193, 333/195
See application file for complete search history.

(56) References Cited

U.S. PATENT DOCUMENTS

| 5,059,848 A | 10/1991 | Mariani |
| 5,155,708 A | 10/1992 | Bedi et al. ............ 367/152 |
| 5,675,314 A | 10/1997 | Chaklader ............ 340/443 |
| 5,729,185 A * | 3/1998 | Johnson et al. ............ 333/193 |
| 5,821,425 A * | 10/1998 | Mariani et al. ............ 73/703 |
| 5,939,817 A * | 8/1999 | Takado ............ 310/348 |
| 6,055,855 A | 5/2000 | Straub ............ 73/146.8 |
| 6,293,136 B1 | 9/2001 | Kim ............ 73/19.03 |
| 6,571,638 B1 * | 6/2003 | Hines et al. ............ 73/702 |
| 6,640,613 B1 | 11/2003 | Rapp et al. ............ 73/24.01 |
| 6,653,906 B1 * | 11/2003 | Knecht ............ 331/107 DP |
| 2002/0113521 A1 | 8/2002 | Rapp et al. ............ 310/313 R |
| 2003/0076743 A1 | 4/2003 | Thompson et al. ............ 367/140 |
| 2004/0020299 A1 | 2/2004 | Freakes et al. |

FOREIGN PATENT DOCUMENTS

JP    04362806    12/1992
WO    WO 2004/113859 A1    12/2004

* cited by examiner

*Primary Examiner*—A. Dexter Tugbang
*Assistant Examiner*—Tai Van Nguyen
(74) *Attorney, Agent, or Firm*—Kermit D. Lopez; Luis M. Ortiz (57) ABSTRACT

A surface acoustic wave die system and method are disclosed herein, including a surface acoustic wave sensor comprising one or more surface acoustic wave die disposed and hermetically sealed between a base and a cover. An adhesive is generally for securing one or more of the surface acoustic wave die to the base, which is configured with a pattern of cross hatches formed thereon in order to permit the adhesive to adhere to the base. The adhesive is placed under a location wherein surface acoustic wave die is to be located. The surface acoustic wave die is thereafter pressed into the adhesive, whereby upon a subsequent curing of the adhesive, the surface acoustic wave die is held securely in place, while remaining flexible as required by sensing applications associated with the surface acoustic save sensor.

21 Claims, 6 Drawing Sheets

METHOD OF MAKING A SURFACE ACOUSTIC WAVE DEVICE

TECHNICAL FIELD

Embodiments are generally related to sensing devices and techniques. Embodiments are also related to interdigital surface wave sensor devices, such as, for example, surface acoustic wave (SAW) devices and sensors. Embodiments also relate to tire pressure sensors utilized for monitoring vehicle tires.

BACKGROUND OF THE INVENTION

Acoustic wave sensors are utilized in a variety of sensing applications, such as, for example, temperature and/or pressure sensing devices and systems. Examples of surface wave sensors include devices such as acoustic wave sensors, which can be utilized to detect the presence of substances, such as chemicals. An acoustical or acoustic wave (e.g., SAW/BAW) device acting as a sensor can provide a highly sensitive detection mechanism due to the high sensitivity to surface loading and the low noise, which results from their intrinsic high Q factor. Surface acoustic wave devices are typically fabricated using photolithographic techniques with comb-like interdigital transducers placed on a piezoelectric material. Surface acoustic wave devices may have either a delay line or a resonator configuration.

One application where surface acoustic wave (SAW) sensors have been utilized effectively involves pressure and/or temperature sensing of vehicle tires. Tire pressure sensors have been assembled in a configuration in which a SAW die floats on a base to which the SAW die is eventually wirebonded. One of the problems with such a configuration is that the SAW die typically does not remain centered during the wirebonding assembly, resulting in poor yields.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide improved sensor devices and sensing techniques.

It is another aspect of the present invention to provide for an improved surface wave sensor device.

It is yet a further aspect of the present invention to provide an improved interdigital surface wave device for pressure sensing purposes.

The aforementioned aspects of the invention and other objectives and advantages can now be achieved as described herein. A surface acoustic wave die system and method are disclosed herein, including a surface acoustic wave sensor comprising one or more surface acoustic wave die disposed and hermetically sealed between a base and a cover. An adhesive is generally for securing one or more of the surface acoustic wave die to the base, which is configured with a pattern of cross hatches formed thereon in order to permit the adhesive to adhere to the base. The adhesive is placed under a location wherein surface acoustic wave die is to be located. The surface acoustic wave die is thereafter pressed into the adhesive, whereby upon a subsequent curing of the adhesive, the surface acoustic wave die is held securely in place, while remaining flexible as required by sensing applications associated with the surface acoustic save sensor.

Thus, the surface acoustic wave die is positioned initially, while still allowing it to flex with pressure via the adhesive located beneath the surface acoustic wave die. The cross-hatch pattern is the same dimensionally as the surface acoustic wave die and can provide a visual location for sensor placement for adherence of the adhesive. The surface acoustic wave die can be composed of one or more interdigital transducers formed upon a piezoelectric substrate surrounded by the base and the cover.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
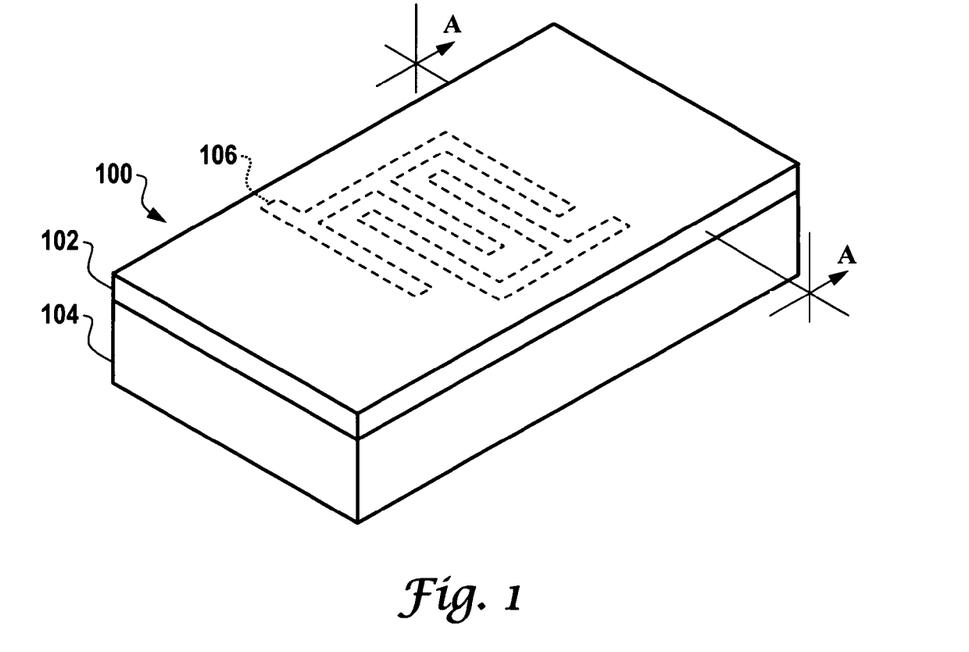
FIG. 1 illustrates a perspective view of an interdigital surface wave device, which can be implemented in accordance with one embodiment of the present invention.

FIG. 1 illustrates a perspective view of an interdigital surface wave device 100, which can be implemented in accordance with one embodiment of the present invention. Surface wave device 100 generally includes an interdigital transducer 106 formed on a piezoelectric substrate 104. The surface wave device 100 can be implemented in the context of a sensor chip. Interdigital transducer 106 can be configured in the form of an electrode. A coating 102 can be selected such that a particular species to be measured is absorbed by the coating 102, thereby altering the acoustic properties of the interdigital surface wave device 100. Various selective coatings can be utilized to implement coating 102. A change in acoustic properties can be detected and utilized to identify or detect the substance or species absorbed and/or adsorbed by the coating 102. Thus, coating 102 can be excited to implement a surface acoustical model. Such an excitation, however, can produce a variety of other modes of interdigital surface wave device 100.

Figure 2:
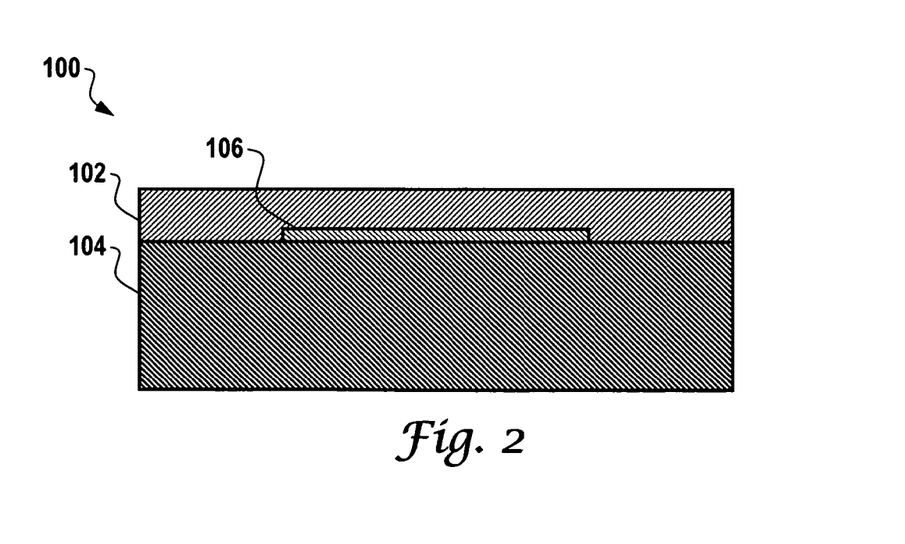
FIG. 2 illustrates a cross-sectional view along line A—A of the interdigital surface wave device depicted in FIG. 1, in accordance with one embodiment of the present invention.

FIG. 2 illustrates a cross-sectional view along line A—A of the interdigital surface wave device 100 depicted in FIG. 1, in accordance with one embodiment of the present invention. Piezoelectric substrate 104 can be formed from a variety of substrate materials, such as, for example, quartz, lithium niobate (LiNbO$_3$), lithium tantalite (LiTaO$_3$), Li$_2$B$_4$O$_7$, GaPO$_4$, langasite (La$_3$Ga$_5$SiO$_{14}$), ZnO, and/or epitaxially grown nitrides such as Al, Ga or Ln, to name a few. Interdigital transducer 106 can be formed from materials, which are generally divided into three groups. First, interdigital transducer 106 can be formed from a metal group material (e.g., Al, Pt, Au, Rh, Ir Cu, Ti, W, Cr, or Ni). Second, interdigital transducer 106 can be formed from alloys such as NiCr or CuAl. Third, interdigital transducer 106 can be formed from metal-nonmetal compounds (e.g., ceramic electrodes based on TiN, CoSi$_2$, or WC). The coating 102 need not cover the entire planar surface of the piezoelectric substrate 104, but can cover only a portion thereof, depending upon design constraints. Selective coating 102 can cover interdigital transducer 106 and the entire planar surface of piezoelectric substrate 104. Because interdigital surface wave device 100 functions as a multiple mode sensing device.

Figure 3:
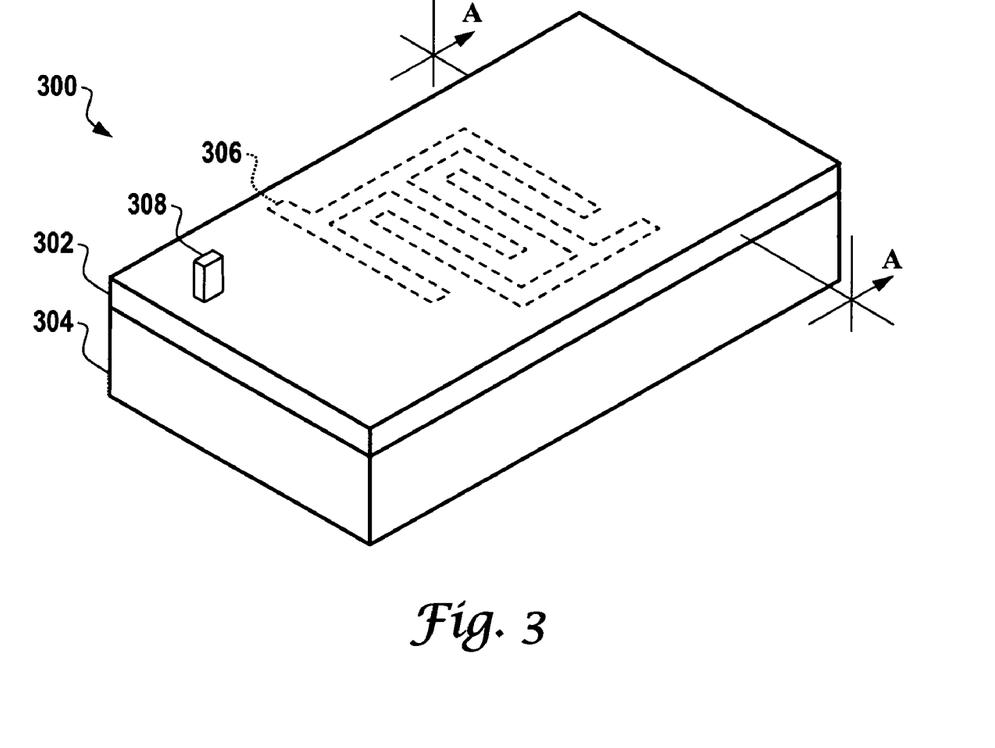
FIG. 3 illustrates a perspective view of an interdigital surface wave device, which can be implemented in accordance with an alternative embodiment of the present invention.
Figure 4:
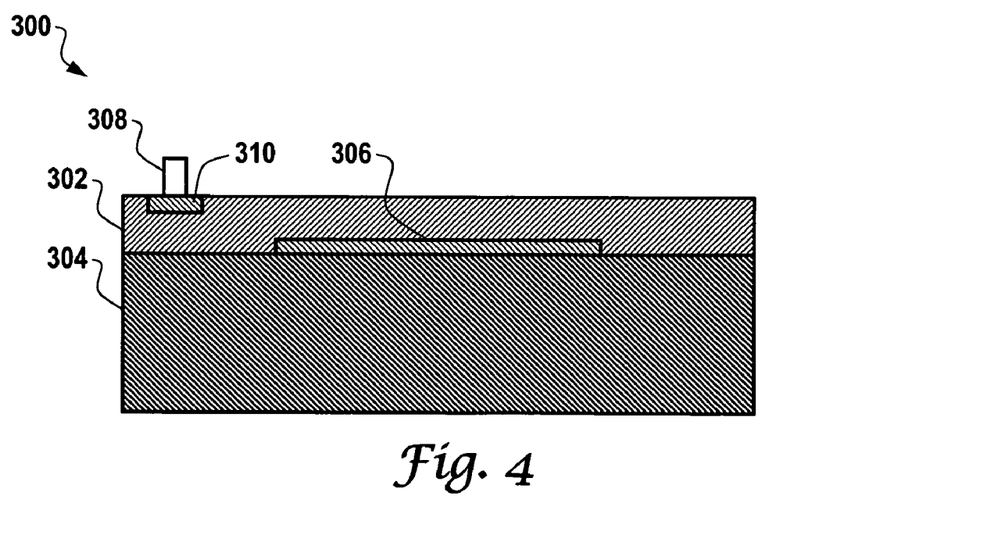
FIG. 4 illustrates a cross-sectional view along line A—A of the interdigital surface wave device depicted in FIG. 3, in accordance with one embodiment of the present invention.

FIG. 3 illustrates a perspective view of an interdigital surface wave device 300, which can be implemented in accordance with an alternative embodiment of the present invention. The configuration depicted in FIGS. 3–4 is similar to that illustrated in FIGS. 1–2, with the addition of an antenna 308, which is connected to and disposed above a wireless excitation component 310 (i.e., shown in FIG. 4). Surface wave device 300 generally includes an interdigital transducer 306 formed on a piezoelectric substrate 304. Surface wave device 300 can therefore function as an interdigital surface wave device, and one, in particular, which utilizing surface-skimming bulk wave techniques. Interdigital transducer 306 can be configured in the form of an electrode.

A coating 302 can be selected such that a particular species to be measured is absorbed by the coating 302, thereby altering the acoustic properties of the interdigital surface wave device 300. Various selective coatings can be utilized to implement coating 302. A change in acoustic properties can be detected and utilized to identify or detect the substance or species absorbed and/or adsorbed by the coating 302. Thus, coating 302 can be excited via wireless means to implement a surface acoustical model.

FIG. 4 illustrates a cross-sectional view along line A—A of the interdigital surface wave device 300 depicted in FIG. 3, in accordance with one embodiment of the present invention. Thus, antenna 308 is shown in FIG. 4 disposed above coating 302 and connected to wireless excitation component 310, which can be formed within an area of coating 302. Similar to the configuration of FIG. 2, Piezoelectric substrate 304 can be formed from a variety of substrate materials, such as, for example, quartz, lithium niobate (LiNbO$_3$), lithium tantalite (LiTaO$_3$), Li$_2$B$_4$O$_7$, GaPO$_4$, langasite (La$_3$Ga$_5$SiO$_{14}$), ZnO, and/or epitaxially grown nitrides such as Al, Ga or Ln, to name a few. Interdigital transducer 306 can be formed from materials, which are generally divided into three groups. First, interdigital transducer 106 can be formed from a metal group material (e.g., Al, Pt, Au, Rh, Ir Cu, Ti, W, Cr, or Ni). Second, interdigital transducer 106 can be formed from alloys such as NiCr or CuAl. Third, interdigital transducer 306 can be formed from metal-nonmetal compounds (e.g., ceramic electrodes based on TiN, CoSi$_2$, or WC).

Figure 5:
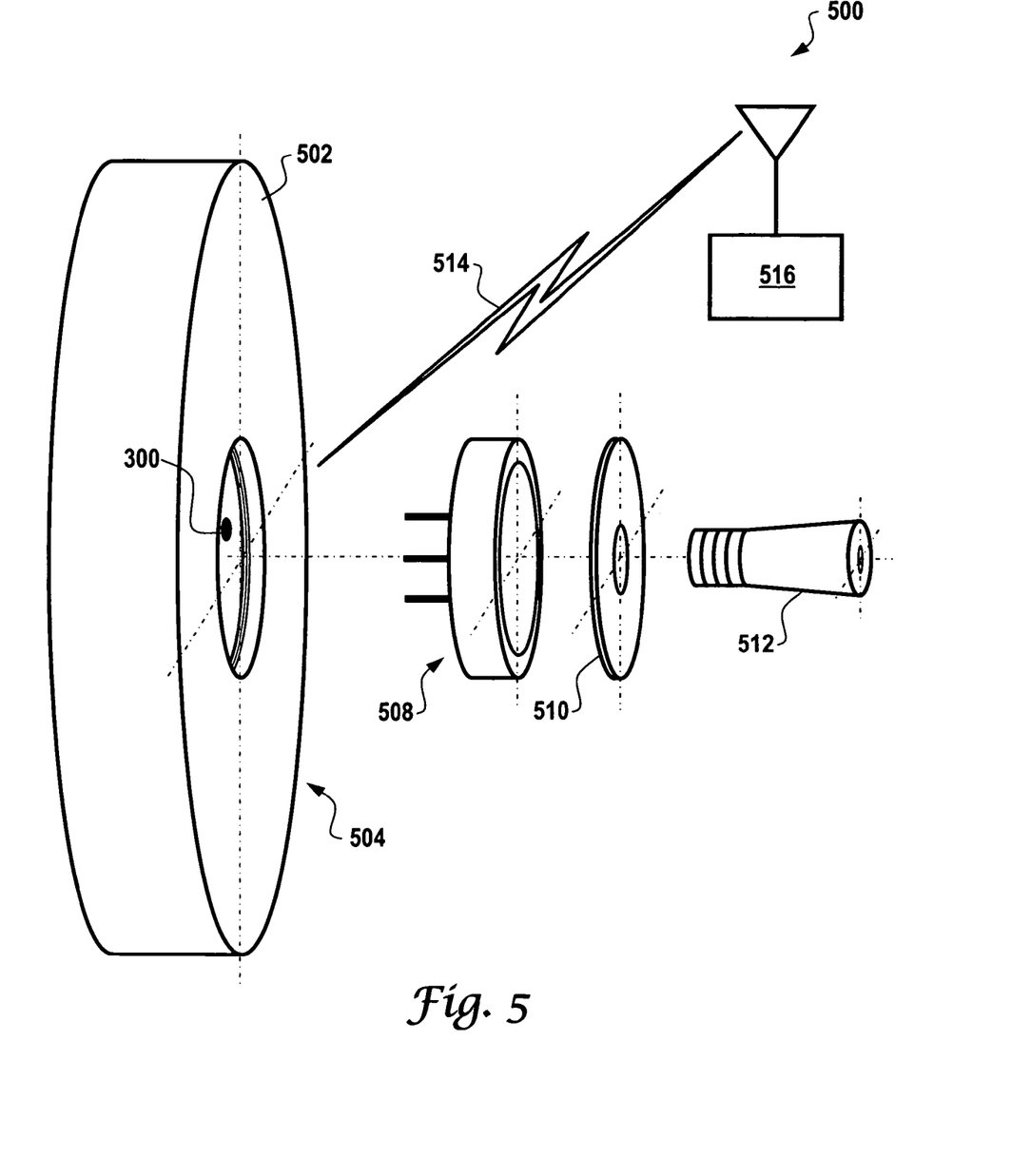
FIG. 5 illustrates an exploded view a tire sensor system, which can be implemented in accordance with an alternative embodiment of the present invention.

FIG. 5 illustrates an exploded view a tire sensor system 500, which can be implemented in accordance with an alternative embodiment of the present invention. System 500 can be implemented in the context of a tire 502 associated with a drum-type brake. It can be appreciated, however, that system 500 can be implemented in the context of other brake systems, such as disk brakes. Tire 502 includes a tire rim 504. System 500 includes a brake drum 506, which can interact with a backing plate 510, which in turn surrounds a vehicle axel 512.

System 500 also includes interdigital surface wave device 300, which is shown in greater detail in FIGS. 3–4. System 500 can be utilized to monitor the pressure and/or temperature of tire 502 by locating interdigital surface wave device 300 at a particular location on tire 502. A wireless signal (e.g., radio frequency, low frequency, etc.) can be transmitted to interdigital surface wave device 300 from a transmitter/receiver 516, which can be located within an automobile and/or elsewhere. The signal excites interdigital surface wave device 300, which produces frequencies indicative of the pressure and/or temperature of tire 502.

Figure 6:
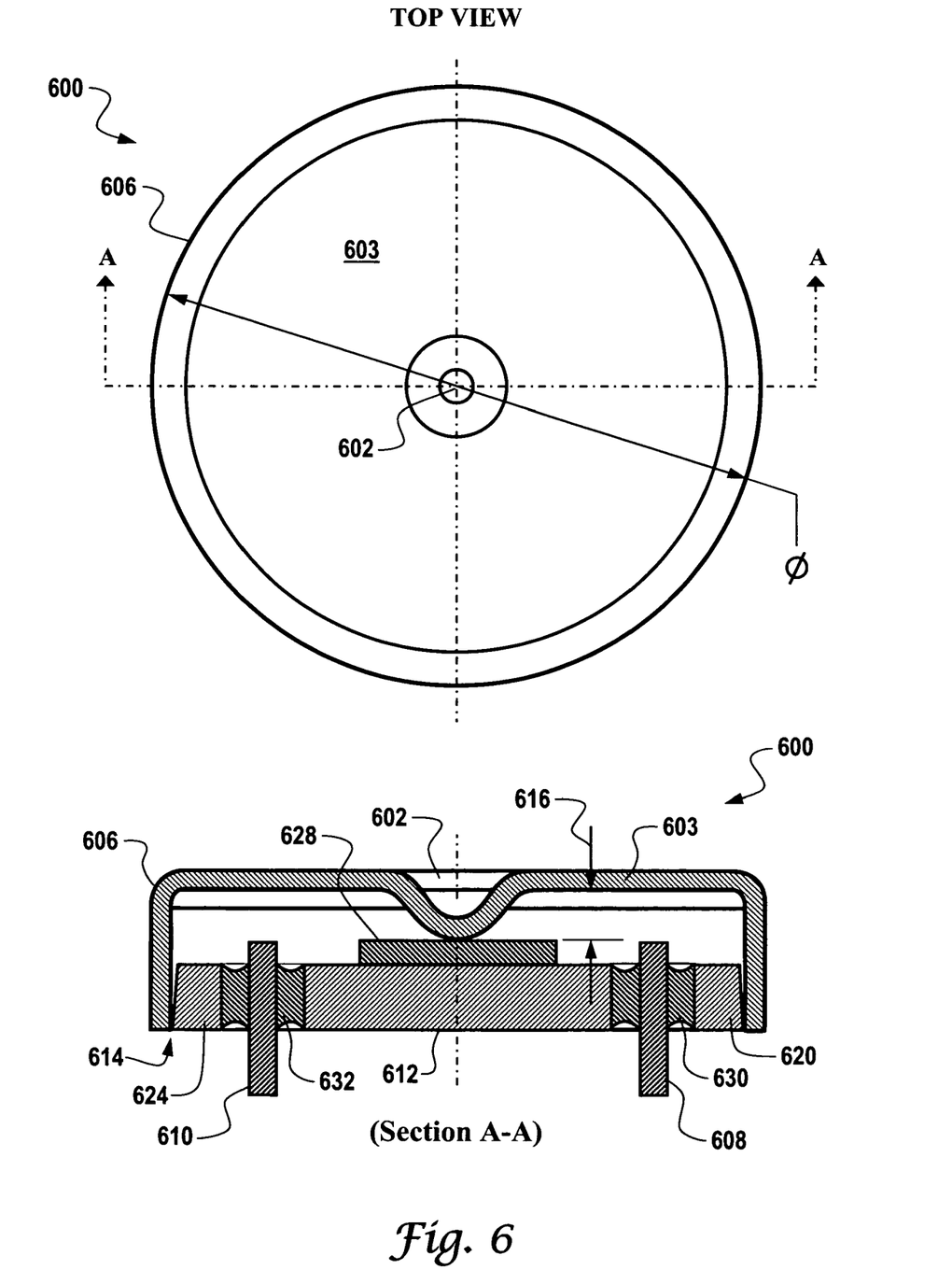
FIG. 6 illustrates top and side views of a sensor, which can be implemented, in accordance with one embodiment of the present invention.

FIG. 6 illustrates top and side views of a sensor 600, which can be adapted for use, in accordance with one embodiment of the present invention. Sensor 600 generally comprises a SAW button sensor or sensor assembly. It can be appreciated that the configuration depicted in FIG. 6 is not considered a limiting feature of the invention. Instead, sensor 600 is provided to illustrate one example of a sensor, including a SAW sensor assembly that can potentially be implemented in accordance with an embodiment. Various other types of other SAW or sensor configurations can also be implemented in accordance with alternative embodiments.

In general, sensor 600 includes a sensor base, which is composed of base portions 620, 612 and 624. Two pins 608 and 610 can be mounted and/or connected to the sensor base. Pins 608 and 610 can be located within areas 630 and 632 of the sensor base. Sensor 600 generally includes a sensor cover 606 which can be configured to include a dimple 602. Note that the particular shape and size of dimple 602 can vary, depending on particular applications. The dimple 602 depicted in FIG. 6 is thus presented for illustrative purposes only and the size and shape thereof are not considered limiting features of the present invention.

A sensor element 628 can be located adjacent to or on base portion 612 in a manner that that permits clearances to form between sensor cover 606 and the sensor base composed of base portions 620, 612 and 624. A sensor diaphragm 603 can be incorporated into the sensor cover 606. The cover 606 can be located the sensor base such that the dimple 602 is in intimate contact with the sensor element 628 at all pressure levels and temperatures thereof.

It can be appreciated from FIG. 6, that instead of using an interference fit between the cover and base, the components thereof can be designed to form a clearance or gap between the cover and base. Such a design does not rely on interference between the two parts to maintain preload, but instead can utilize welding, soldering or other connecting means to lock the components in position at the time the cover is assembled to the base.

The components can be designed such that even if the cover is at its smallest inside dimension within the tolerance range and the base is at its largest outside dimension within the tolerance range there will be clearance between them when they are assembled together. Thus, a clearance should exist generally between the cover and base even if the cover is at its smallest dimension within the tolerance range and the base is at its largest dimension within the tolerance range. The intent of such a feature is to produce the parts at their nominal dimension.

Figure 7:
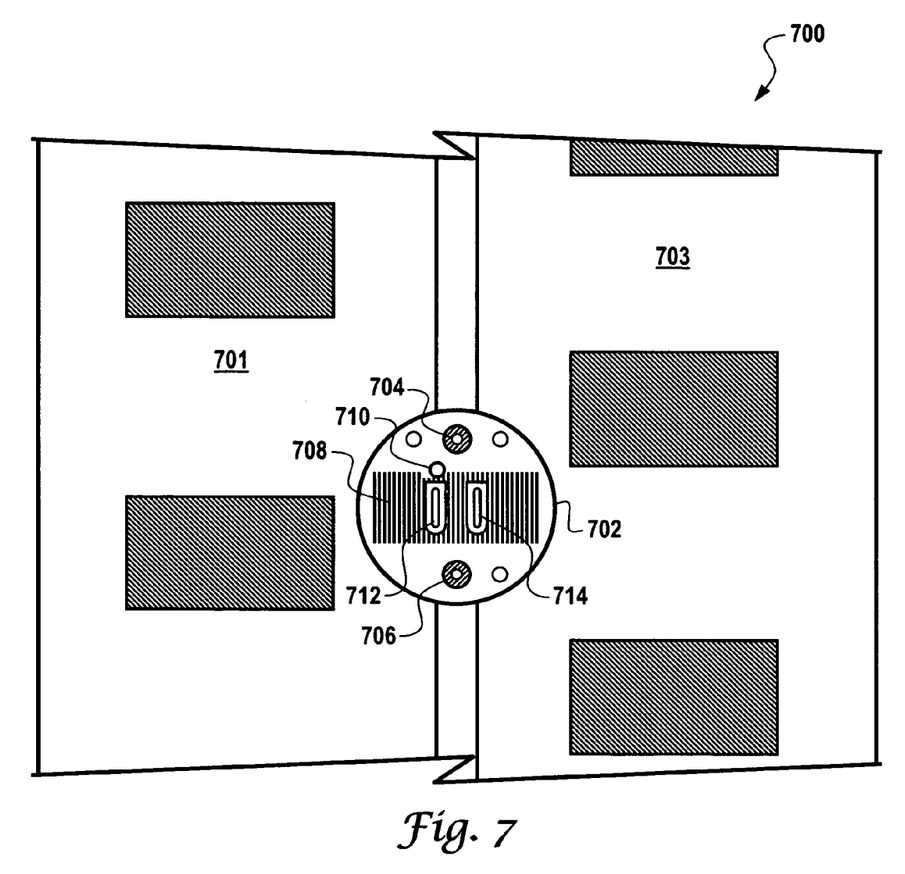
FIG. 7 illustrates a block diagram of an acoustic wave sensor system, which can be implemented in accordance with a preferred embodiment of the present invention.
Figure 8:
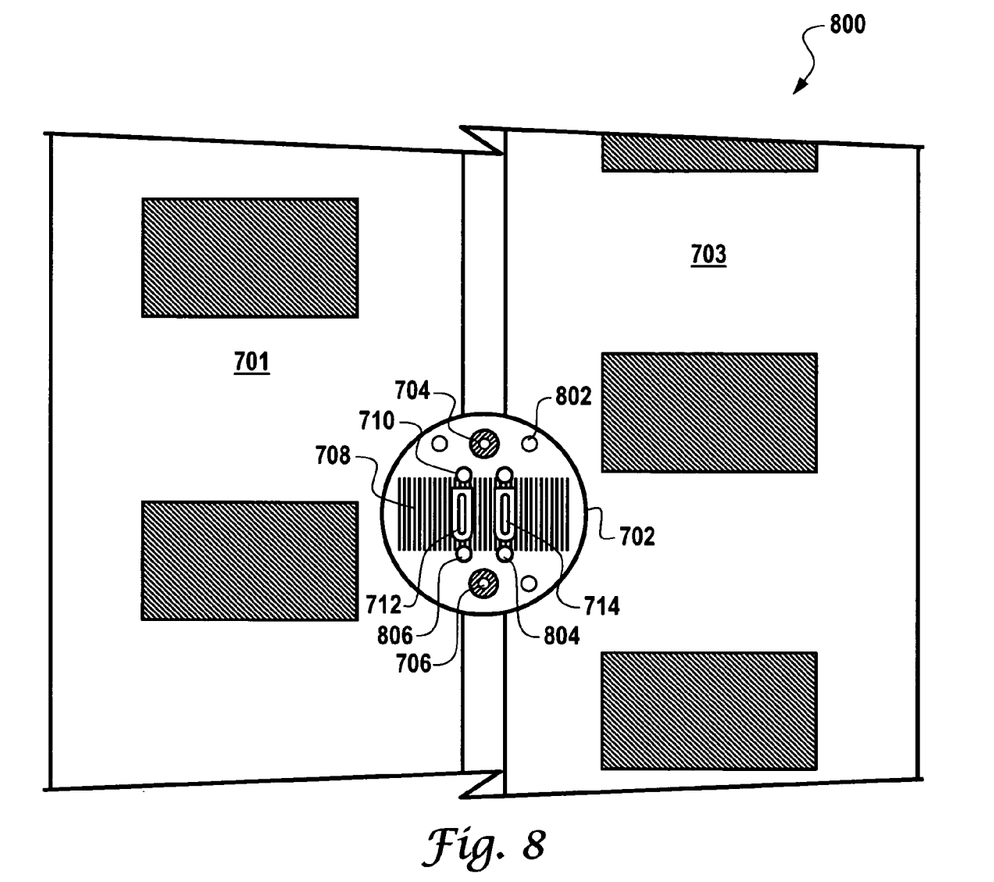
FIG. 8 illustrates a block diagram of an acoustic wave sensor system, which can be implemented in accordance with an alternative embodiment of the present invention.

FIG. 7 illustrates a block diagram of an acoustic wave sensor system 700, which can be implemented in accordance with a preferred embodiment of the present invention. Similarly, FIG. 8 illustrates a block diagram of an acoustic wave sensor system 800, which can be implemented in accordance with an alternative preferred embodiment of the present invention. Note that in FIGS. 7–8, identical or similar parts are indicated by identical reference numerals. In general, system 700 can be implemented as a surface acoustic wave sensor comprising one or more surface acoustic wave die disposed and hermetically sealed between a base 702 and a cover (not shown in FIG. 7). In FIG. 7 a surface acoustic wave die 710 is depicted, while in FIG. 8, surface acoustic wave die 710, 802, 804, and 806 are shown.

An adhesive can be provided for securing the surface acoustic wave die 710 to the base 702, such that the base 702 is figured to include a pattern of cross hatches 708 formed thereon that permit the adhesive to adhere to the base 702. The adhesive can be placed under a location wherein the surface acoustic wave die(s) 710, 802, 804 and/or 806 are to be located, such that the surface acoustic wave die 710, 802, 804 and/or 806 are thereafter pressed into the adhesive. Upon a subsequent curing of the adhesive, the surface acoustic wave die 710, 802, 804 and/or 806 can be held securely in place, while remaining flexible as required by sensing applications associated with the surface acoustic save sensor systems 700 and/or 800. In general, pins 704 and 706 terminate to the SAW device with wire bonds, while raised areas 712 and 714 are configured in base 702 to set on the SAW die 710, 802, 804 and/or 806 to allow the die 710, 802, 804 and/or 806 to flex.

The surface acoustic wave die 710, 802, 804 and/or 806 comprise can be configured to include one or more interdigital transducers formed upon a piezoelectric substrate surrounded by a base and a cover. An example of such an interdigital transducer is an interdigital surface wave device 100 and/or 300 depicted in FIGS. 1–4 herein. Note that the location wherein the acoustic wave die 710, 802, 804 and/or 806 can be, for example, a tire such as tire 502 depicted in FIG. 5. Additionally, the pattern of cross hatches 708 can provide a visual location for placement of the surface acoustic wave die and for adherence of the adhesive.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The invention claimed is:

1. A surface acoustic wave die method, comprising the steps of:
    configuring a surface acoustic wave sensor to comprise at least one surface acoustic wave die disposed and hermetically sealed between a base and a cover;
    providing a plurality of raised areas in said base upon which to set said at least one surface acoustic wave die and permit said at least one acoustic wave die to flex;
    forming a pattern of cross hatches upon said base to permit an adhesive to adhere to said base, wherein said pattern of cross hatches is dimensionally the same size as said at least one surface acoustic wave die;
    securing said at least one surface acoustic wave die to said base utilizing said adhesive;
    placing said adhesive under a location wherein said at least one surface acoustic wave die is to be located; and
    thereafter pressing said at least one surface acoustic wave die into said adhesive, wherein upon a subsequent curing of said adhesive, said at least one surface acoustic wave die is held securely in place.

2. The method of claim 1 further comprising the step of configuring said at least one surface acoustic wave die to comprise at least one interdigital transducer formed upon a piezoelectric substrate surrounded by said base and said cover.

3. The method of claim 1 further comprising the step of locating said at least one surface acoustic wave die on a tire.

4. The method of claim 1 wherein said pattern of cross hatches provides a visual location for placement of said at least one surface acoustic wave die and for adherence of said adhesive.

5. The method of claim 1 further comprising the step of forming a clearance between said base and said cover.

6. The method of claim 1 further comprising the steps of:
    configuring said surface acoustic wave sensor to comprise a surface wave device comprising an interdigital transducer and an acoustic coating formed upon a piezoelectric substrate; and
    integrating an antenna with said surface wave device, wherein said antenna receives at least one signal, which excites said acoustic coating to produce at least one frequency output for temperature or pressure effect analysis thereof.

7. The method of claim 6 further comprising the step of providing a transmitter for transmitting said at least one signal to said antenna integrated with said surface wave device for exciting said acoustic coating to produce said at lest one frequency output for temperature or pressure effect analysis thereof.

8. The method of claim 7 further comprising the step of providing a receiver, wherein said receiver is associated with said antenna integrated with said surface wave device receives and receives said at least one signal transmitter from said transmitter.

9. The method of claim 7 wherein said interdigital transducer comprises a quartz crystal.

10. A surface acoustic wave die method, comprising the steps of:
    configuring a surface acoustic wave sensor to comprise at least one surface acoustic wave die disposed and hermetically sealed between a base and a cover;
    providing a plurality of raised areas in said base upon which to set said at least one surface acoustic wave die and permit said at least one acoustic wave die to flex;

configuring said at least one surface acoustic wave die to comprise at least one interdigital transducer formed upon a piezoelectric substrate surrounded by said base and said cover;

forming a pattern of cross hatches upon said base to permit an adhesive to adhere to said base, wherein said pattern of cross hatches is dimensionally the same size as said at least one surface acoustic wave die;

securing said at least one surface acoustic wave die to said base utilizing said adhesive;

placing said adhesive under a location wherein said at least one surface acoustic wave die is to be located;

thereafter pressing said at least one surface acoustic wave die into said adhesive, wherein upon a subsequent curing of said adhesive, said at least one surface acoustic wave die is held securely in place.

11. The method of claim 10 further comprising the steps of:

configuring said surface acoustic wave sensor to comprise a surface wave device comprising an interdigital transducer and an acoustic coating formed upon a piezoelectric substrate; and integrating an antenna with said surface wave device, wherein said antenna receives at least one signal, which excites said acoustic coating to produce at least one frequency output for temperature or pressure effect analysis thereof.

12. The method of claim 10 further comprising the step of providing a transmitter for transmitting said at least one signal to said antenna integrated with said surface wave device for exciting said acoustic coating to produce said at lest one frequency output for temperature or pressure effect analysis thereof.

13. The method of claim 12 further comprising the step of providing a receiver, wherein said receiver is associated with said antenna integrated with said surface wave device receives and receives said at least one signal transmitter from said transmitter.

14. The method of claim 13 wherein said interdigital transducer comprises a quartz crystal.

15. A surface acoustic wave die method, comprising the steps of:

configuring a surface acoustic wave sensor to comprise at least one surface acoustic wave die disposed and hermetically sealed between a base and a cover;

providing a plurality of raised areas in said base upon which to set said at least one surface acoustic wave die and permit said at least one acoustic wave die to flex;

configuring said surface acoustic wave sensor to comprise a surface wave device comprising an interdigital transducer and an acoustic coating formed upon a piezoelectric substrate;

integrating an antenna with said surface wave device, wherein said antenna receives at least one signal, which excites said acoustic coating to produce at least one frequency output for temperature or pressure effect analysis thereof;

forming a pattern of cross hatches upon said base to permit an adhesive to adhere to said base, wherein said pattern of cross hatches is dimensionally the same size as said at least one surface acoustic wave die;

securing said at least one surface acoustic wave die to said base utilizing said adhesive;

placing said adhesive under a location wherein said at least one surface acoustic wave die is to be located; and thereafter pressing said at least one surface acoustic wave die into said adhesive, wherein upon a subsequent curing of said adhesive, said at least one surface acoustic wave die is held securely in place, while remaining flexible as required by sensing applications associated with said surface acoustic save sensor.

16. The method of claim 15 further comprising the step of providing a transmitter for transmitting said at least one signal to said antenna integrated with said surface wave device for exciting said acoustic coating to produce said at lest one frequency output for temperature or pressure effect analysis thereof.

17. The method of claim 16 further comprising the step of providing a receiver, wherein said receiver is associated with said antenna integrated with said surface wave device receives and receives said at least one signal transmitter from said transmitter.

18. The method of claim 16 wherein said interdigital transducer comprises a quartz crystal.

19. The method of claim 15 further comprising the step of locating said at least one surface acoustic wave die on a tire.

20. The method of claim 15 wherein said pattern of cross hatches provides a visual location for placement of said at least one surface acoustic wave die and for adherence of said adhesive.

21. The method of claim 15 further comprising the step of forming a clearance between said base and said cover.

* * * * *